(12) United States Patent
Kajiwara et al.

(10) Patent No.: US 6,339,476 B2
(45) Date of Patent: *Jan. 15, 2002

(54) IMAGE GENERATING APPARATUS

(75) Inventors: Tadayuki Kajiwara, Chikushino; Kazunori Nakamura, Kasuga; Yoshitsugu Hayashi, Fukuoka, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,665

(22) Filed: Sep. 15, 1997

(30) Foreign Application Priority Data

Sep. 20, 1996 (JP) .............................................. 8-249501

(51) Int. Cl.[7] .............................................. G06F 15/00
(52) U.S. Cl. ........................................ 358/1.13; 358/1.9
(58) Field of Search ............................... 358/1.14, 1.13, 358/1.12, 1.11, 1.1, 1.9, 1.15, 1.16

(56) References Cited

U.S. PATENT DOCUMENTS

| 5,566,253 A | * 10/1996 | Nakashima et al. | 382/299 |
| 5,621,453 A | * 4/1997 | Fujita et al. | 347/240 |
| 5,870,142 A | * 2/1999 | Noda et al. | 348/266 |
| 5,956,070 A | * 9/1999 | Paoli et al. | 347/241 |
| 5,995,195 A | * 11/1999 | Kodama et al. | 355/37 |

* cited by examiner

Primary Examiner—Joseph Mancuso
Assistant Examiner—Douglas Tran
(74) Attorney, Agent, or Firm—Stevens, Davis, Miller & Mosher, LLP

(57) ABSTRACT

A first image data selective output section selects odd-numbered image data of the second raster scan line from a memory section to cause a first exposure section to form an electrostatic latent image on a photoconductor drum. At the same time, a second image data selective output section selects even-numbered image data of the first raster scan line from the memory section to cause a second exposure section to form an electrostatic latent image on the photoconductor drum. In the second main scanning operation, positions of light beams are moved by an amount of one raster line in a sub-scanning direction so that the first image data selective output section forms odd-numbered image data of the third raster line and at the same time, the second image data selective output section forms even-numbered image data of the second raster line.

2 Claims, 16 Drawing Sheets

IMAGE GENERATING APPARATUS

BACKGROUND OF THE INVENTION

1. Field of the Invention

The present invention relates to an image generating apparatus for generating an image on recording paper through an electrophotographic or xerographic process.

2. Description of the Related Art

As the processing speed of personal computers and workstations has increased on recent years, it has also been increasing demand to speed up the processing of an image generating apparatus based on a xerographic process. With such an image generating apparatus as mentioned above, when a polygon mirror included in an exposure optical system is increased in its rotational speed, it is possible to speed up its printing operation. In the prior art, however, the increased rotational speed of the polygon mirror has already reached its limit. For this reason, as another additional speeding-up measure, a plurality of semiconductor lasers for forming an electrostatic latent image on a photoconductor drum are provided to realize a simultaneous recording system.

An arrangement and operation of a prior art image generating apparatus having a plurality of semiconductor lasers will be explained in the following. FIG. 11 is an arrangement of an exposure optical system having a plurality of semiconductor lasers therein in the prior art. The exposure optical system of FIG. 11 includes first and second semiconductor lasers 21 and 22, which are positioned so that laser beams emitted from the lasers 21 and 22 are crossed perpendicularly to each other. A collimator lens 23 for making the input light beams parallel is positioned in a beam exit direction of the first semiconductor laser 21, and a collimator lens 24 is similarly positioned on a beam exit direction of the second semiconductor laser 22. Disposed on light exit sides of the collimator lenses 23 and 24 is a beam splitter 25 which functions to deflect the laser beam of the first semiconductor laser 21 to a direction perpendicular thereto, transmit the laser beam of the second semiconductor laser 22 therethrough and guide the beams onto a surface of a polygon mirror 26. The polygon mirror 26, which is disposed on a rotatary axis of a polygon motor (not shown in the drawing) rotating at a high speed, acts to cause the laser beams received from the first and second semiconductor lasers 21 and 22 to be scanned on a photoconductor drum 1. Disposed between the polygon mirror 26 and the photoconductor drum 1 are on f lens 27 for reducing the diameter of the laser beams reflected on the polygon mirror 26 to a predetermined value as well as on a reflecting mirror 28.

With this image generating apparatus, image data corresponding to 2 lines can be recorded at a time in a main scanning direction B of the photoconductor drum 1 from the 2 laser beams received from the first and second semiconductor lasers 21 and 22.

Further, FIG. 12 shows a control block diagram of a prior art image generating apparatus having 2 semiconductor lasers. FIG. 13 is a detailed circuit diagram of a first image data selective output means in the prior art image generating apparatus. In FIG. 12, an image data generating means 31 generates image data (bit map data) on the basis of image information received from a host computer (not shown). A memory means 32 stores therein the image data generated by the image data generating means 31. Further, a first image data selective output means 37 and a second image data selective output means 38 act to extract the image data from the memory means 32 and output it to a first exposure energy control means 35 and a second exposure energy control means 36, respectively. The first and second exposure energy control means 35 and 36 respectively control exposure energy (light emission time, light emission power) of the first and second semiconductor lasers 21 and 22 incorporated in first and second exposure means 33 and 34 (which will be explained later).

The first and second exposure means 33 and 34, which include the first and second semiconductor lasers 21 and 22, respectively, irradiate laser beams on the photoconductor drum 1 to form an electrostatic latent image on the photoconductor drum 1.

An output control means 39, on the basis of a printing operation reference signal, controls the operation of the sequential output of the image data stored in the memory means 32 to the first and second image data selective output means 37 and 38. Further, a clock generating means 40 generates a clock (which will be referred to as the video clock) that is used as a reference to the output operation of the first and second semiconductor lasers 21 and 22.

Explanation will now be made as to the operation of the image generating apparatus having the above arrangement. In FIG. 11, image data is optically modulated by the first and second semiconductor lasers 21 and 22 so that output laser beams of the respective semiconductor lasers are converted by the collimator lenses 23 and 24 to collimated or parallel light and then input to the beam splitter 25. The beam splitter 25 in turn deflects by 90 degrees the laser beam received from the first semiconductor laser 21 and then guides it to the polygon mirror 26; whereas the beam splitter 25 transmits the laser beam received from the second semiconductor laser 22 therethrough and then guides it to the polygon mirror 26. The polygon mirror 26, while rotated by the polygon motor (not shown), scans the laser beams received from the first and second semiconductor lasers 21 and 22 at a predetermined angle. The laser beams are further input to the f lens 27 where the laser beams are reduced in diameter to a predetermined diametered single beam, and then the single beam is scanned by the reflecting mirror 28 on the photoconductor drum 1 in the direction (main scanning direction) shown by an arrow B. In this case, the photoconductor drum 1 is rotating at a constant speed Vp (mm/sec.) in a direction shown by an arrow A.

FIG. 14 is a diagram for explaining how image data is generated in the prior art image generating apparatus. As shown in FIG. 14, picture elements (pixels) 30 each having an illustrated diameter are formed by the laser beam issued from the second semiconductor laser 22 on the first raster scan line, while picture elements (pixels) 29 each having the same diameter as that of the pixel 30 are formed by the laser beam issued from the first semiconductor laser 21 on the second raster scan line. The above operation is sequentially repeated in a direction shown by an arrow C so that the laser beam issued from the second semiconductor laser 22 forms pixels of the odd-numbered raster scan lines, whereas the laser beam issued from the first semiconductor laser 21 forms pixels of the even-numbered raster scan lines. As a result, printing can be realized at a speed of twice as fast as the case of using a single semiconductor laser.

Explanation will next be made as to specific control operation when image data having a main scan (horizontal scanning) resolution of 600 dpi and a feed scan (vertical scanning) or sub-scan resolution of 600 dpi is output to the photoconductor drum 1. FIG. 15 is a timing chart of the first image data selective output means of the prior art image generating apparatus, and FIG. 16 is a diagram showing a relationship between pixel formation and laser emission time in the prior art image generating apparatus.

In FIG. 12, the image data generating means 31, on the basis of image information received from the host computer (not shown), generates image data (bit map data) and stores it in the memory means 32. On the basis of a printing operation reference signal (not shown), the output control means 39 controls the memory means 32 to cause the memory means 32 to output the first and second raster scan lines of the image data therefrom to the second and first image data selective output means 38 and 37 respectively. That is, as shown in FIG. 13, a semiconductor memory (DRAM) 41 within the memory means 32 is connected to a parallel/serial converter 42 within the first image data selective output means 37 through a bus 8 bits of D7–D0. The output control means 39 generates a predetermined address and sends it to the DRAM 41 to read out image data at the address, and loads the read-out image data to the parallel/serial converter 42 under a signal LD.

The image data of D7–D0 loaded into the parallel-to-serial converter 42, as shown in FIG. 15, in synchronism with a video clock f received from the clock generating means 40, serially outputs the image data (starting from D7 and ending in D0) from a serial output terminal Q7 to the first exposure energy control means 35 as a laser beam emission signal of the second raster scan line.

Further, the output control means 39 outputs the next address to read out image data at the address from the DRAM 41. The similar operation to the above is repeated to cause the parallel-to-serial converter 42 to sequentially output the image data of the fourth raster scan line as a laser beam emission signal.

Similarly, the second image data selective output means 38 sequentially outputs the image data of the first raster scan line to the second exposure energy control means 36 as serial image data.

The first and second exposure energy control means 35 and 36, according to the received image data, send the respective laser beam emission signals of predetermined emission time and power to the first semiconductor laser 21 of the first exposure means 33 and also to the second semiconductor laser 22 of the second exposure means 34 for modulation, respectively. As shown in FIG. 15, the laser beam emission time of the first and second semiconductor lasers 21 and 22 is usually set at a period time of the video clock f, so that such a predetermined size (beam diameter) of pixel dots as shown in FIG. 16 is formed. In the drawing, the black dot or circle denotes the presence of the pixel output and the white dot or circle denotes the absence of the pixel output.

In the case of the prior art image generating apparatus having the aforementioned arrangement, in order to obtain a high quality of such text image as characters or lines, it is necessary to increase its pixel density or resolution. FIG. 17 is a timing chart of the first image data selective output means of the prior art image generating apparatus when the apparatus is operated in a high-density record mode, and FIG. 18 shows a relationship between the laser beam emission signal and formed pixels with the same high resolution. For example, when the resolution in the main scanning direction B is changed from 600 dpi to 1200 dpi as shown in FIG. 18, it is necessary to set the frequency of the video clock at twice (2 fHz) as shown in FIG. 17.

However, this also requires the other circuits to operate at a speed of twice the previous operational speed, which also increases noise such as unnecessary irradiation. In this way, this involves a problem in which the circuit costs become high.

In order to obtain a high quality of image such as a photograph, further, it is necessary to increase or enhance its pixel density or gray shade property (gradient). For enhancing the gray shade property, it is required to divide exposure energy into a plurality of stages of energy. However, the division of exposure energy into such a plurality of stages by one scan of the semiconductor laser involves the complication of the control circuit, thus disadvantageously increasing the circuit costs.

SUMMARY OF THE INVENTION

It is accordingly an object of the present invention to provide an image generating apparatus which can produce a high quality of image without the need for increasing the frequency of a video clock and can provide gray shade display with use of a simple control circuit.

In accordance with the present invention, there is provided an image generating apparatus which has a plurality of exposure means for optically modulating image data to record a plurality of main scanning lines of the image data on a recording medium through a single main scanning operation, and which comprises image data selective output means for selecting the image data corresponding to the plurality of exposure means from the image data forming one of the main scanning lines and outputting the selected image data to the respective exposure means; and control means for controlling the operation of the image data selective output means in such a manner that the plurality of exposure means perform sequential scanning operation over the one main scanning line based on the image data issued from the image data selective output means to record the image data.

In the image generating apparatus of the present invention, one of the main scanning lines of image data is recorded through a plurality of scanning operations of the plurality of exposure means. For this reason, even when the number of pixels of one main scanning line is increased, the number of image data to be recorded for one main scanning line by one exposure means can be maintained as in the prior art. Accordingly, high-density image formation can be implemented through a plurality of recording operations of the plurality of exposure means over the image data without the need for increasing the frequency of a video clock for generating the timing of irradiation or illumination of an exposure light beam from one exposure means.

In accordance with the present invention, there is also provided an image generating apparatus which has a plurality of exposure means for optically modulating image data to record a plurality of main scanning lines of the image data on a recording medium through a single main scanning operation, and which comprises image data division/output means for dividing the image data forming one of the main scanning lines into predetermined gray shade levels of image data and outputting the divided image data to the respective exposure means; and control means for controlling the operation of the image data division/output means in such a manner that the plurality of exposure means perform sequential scanning operation over the one main scanning line based on the image data issued from the image data divisional/output means to record the image data.

In the image generating apparatus of the present invention, the image data division/output means divides the image data into different gray shade levels of image data and outputs them to the plurality of exposure means. The respective exposure means form pixels allowing the gray shade display according to the gray shade levels of the received image data. In addition, image data are recorded based on the different-level gray shade display through a plurality of scanning operations of the plurality of exposure means over one main scanning line. Since one exposure means can perform the gray shade display as controlled to a constant exposure condition, the gray shade display can be realized through easy-to-control operation.

In accordance with a first aspect of the present invention, there is provided an image generating apparatus which has a plurality of exposure means for optically modulating image data to record a plurality of main scanning lines of the image data on a recording medium through a single main scanning operation, and which comprises image data selective output means for selecting the image data corresponding to the plurality of exposure means from the image data forming one of the main scanning lines and outputting the selected image data to the respective exposure means; and control means for controlling operation of the image data selective output means in such a manner that the plurality of exposure means perform sequential scanning operation over the one main scanning line based on the image data issued from the image data selective output means to record the image data.

Thus, high-density image formation can be carried out without the need for increasing the frequency of a video clock signal for controlling the timing of exposure operations of the respective exposure means.

In accordance with a second aspect of the present invention, in the image generating apparatus of the first aspect, a plurality of the image data selective output means are provided for the plurality of exposure means, and the control means performs the control operation in such a manner that as a main scanning position of the plurality of exposure means advances by one line in a sub-scanning direction perpendicular to the main scanning direction, the plurality of exposure means simultaneously record the image data on a plurality of main scanning lines based on the image data issued from the image data selective output means.

Therefore, when the plurality of exposure means are advanced by an amount of each one line in the sub-scanning direction through the repetitive main scanning operation, one main scanning line of image data can be recorded through the scanning operations of the plurality of exposure means, and thus high-density image formation can be realized without the need for increasing the frequency of the video clock signal.

In accordance with a third aspect of the present invention, in the image generating apparatus of the first or second aspect, the image data selective output means includes change-over means for switching between a first mode in which a plurality of main scanning lines of image data to be simultaneously recorded are output to the associated exposure means and a second mode in which the image data selective output means selects image data corresponding to the plurality of exposure means from the image data of one main scanning line and outputs the selected image data to the respective exposure means.

Thus, selection can be made between the normal operation of image formation of plural lines and the high-density image formation operation.

In accordance with a fourth aspect of the present invention, there is provided an image generating apparatus which has a plurality of exposure means for optically modulating image data to record a plurality of main scanning lines of the image data on a recording medium through a single main scanning operation, and which comprises image data division/output means for dividing the image data forming one of the main scanning lines into predetermined gray shade levels of image data and outputting the divided image data to the respective exposure means; and control means for controlling operation of the image data division/output means in such a manner that the plurality of exposure means perform sequential scanning operation over the one main scanning line based on the image data issued from the image data division/output means to record the image data.

Therefore, the gray shade display using the plurality of exposure means can be realized through simple control operation while eliminating the need for changing the exposure conditions of one exposure means.

In accordance with a fifth aspect of the present invention, in the image generating apparatus of the fourth aspect, the plurality of exposure means, on the basis of image data received from the image data division/output means, irradiate exposure light beams having different exposure energies on the recording medium and overlap the exposure light beams issued from the plurality of exposure means with respect to predetermined pixels to record the image data of the different gray shade levels.

Thus, image gray shade display can be realized by making different the exposure energies of the plurality of exposure means.

In accordance with a sixth aspect of the present invention, in the image generating apparatus of the fourth or fifth aspect, a plurality of image data division/output means are provided for the plurality of exposure means.

Therefore, when the respective image data division/output means output image data to the associated exposure means according to the gray shade levels, gray shade display can be realized.

In accordance with a seventh aspect of the present invention, in the image generating apparatus of any of the fourth to sixth aspects, the image data division/output means includes change-over means for switching between a first mode in which a plurality of main scanning lines of image data to be simultaneously recorded are output to the associated exposure means and a second mode in which the image data division/output means divides image data of one of the main scanning lines into predetermined gray shade levels of image data and outputs the divided image data to the respective exposure means.

Thus, change-over can be carried out between the normal mode of image formation by the simultaneous scanning operation of a plurality of lines and the image formation mode based on the gray shade display.

BRIEF DESCRIPTION OF THE DRAWINGS

FIGS. 5A and 5B show, in the form of a model 7, a pixel formation condition in the image generating apparatus of the first embodiment, in which FIG. 5A shows a pixel formation of 1200×600 dpi and FIG. 5B shows a pixel formation of 1200×1200 dpi;

DESCRIPTION OF THE PREFERRED EMBODIMENTS (Embodiment 1)

Figure 1:
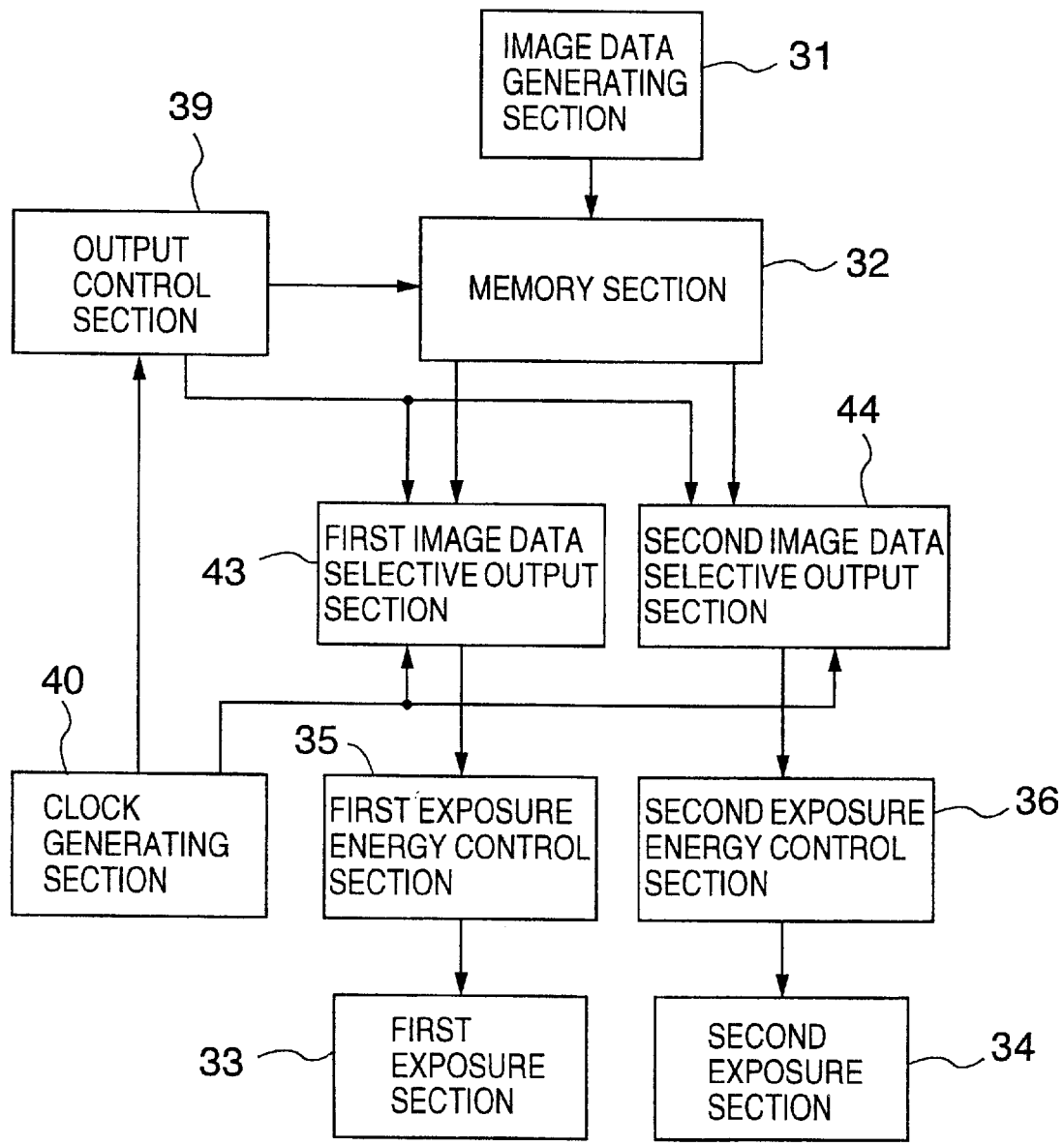
FIG. 1 is a control block diagram of an image generating apparatus in accordance with a first embodiment of the present invention.
Figure 2:
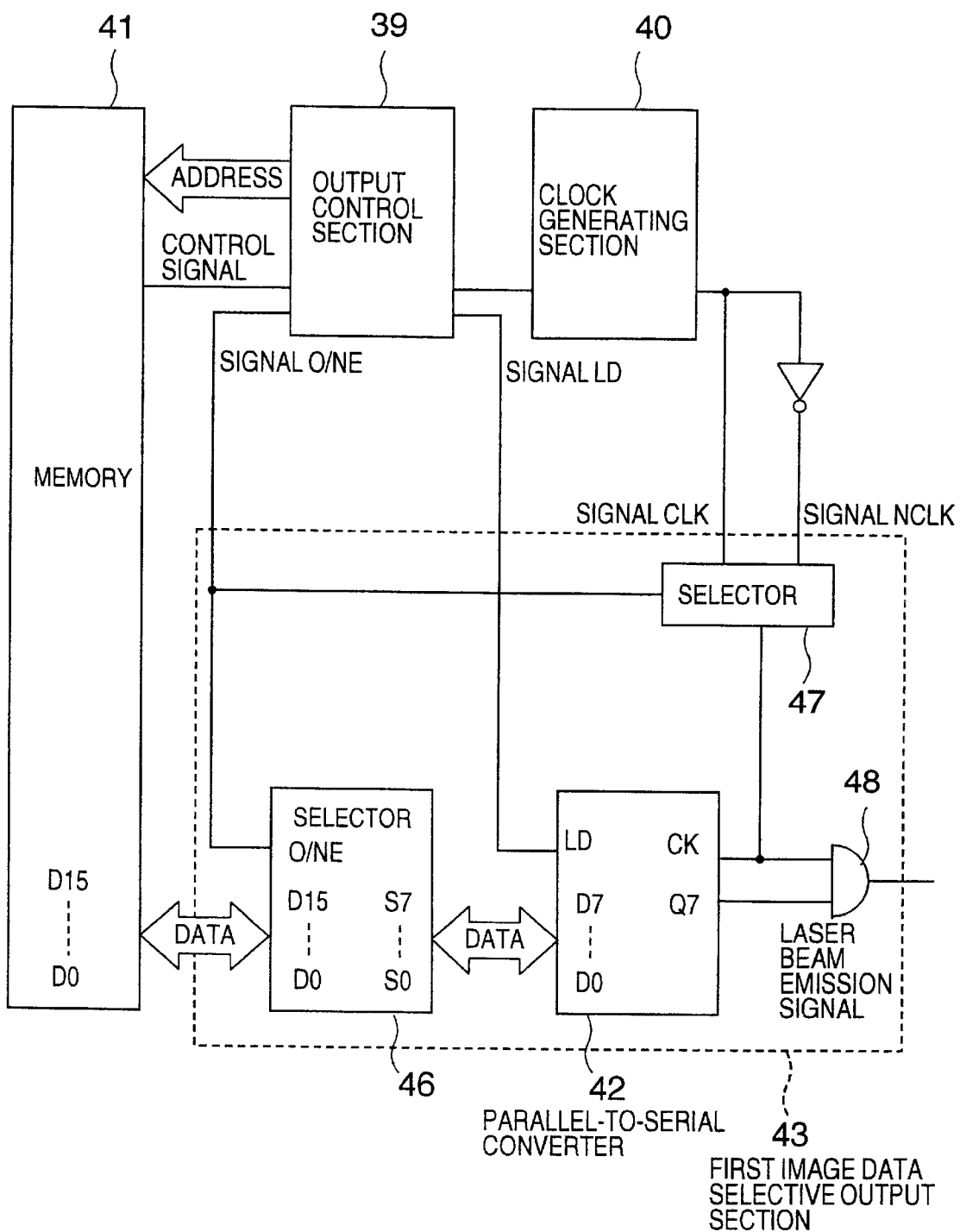
FIG. 2 is a detailed circuit diagram of a first image data selective output section in the image generating apparatus of the first embodiment of the present invention.

FIG. 1 is a control block diagram of an image generating apparatus in accordance with a first embodiment of the present invention. FIG. 2 is a detailed circuit diagram of a first image data selective output section in the image generating apparatus of the first embodiment. In this connection, the arrangement of the image generating apparatus of the present invention is substantially the same as that of the prior art image generating apparatus of FIG. 11 and thus explanation thereof is omitted.

In FIG. 1, an image data generating section 31, on the basis of image information received from a host computer (not shown), generates image data (bit map data). A memory section 32 stores therein the image data generated by the image data generating section 31. An output control section 39, on the basis of a printing operation reference signal (not shown), controls the memory section 32 to output the image data stored in the memory section 32 to first and second image data selective output sections 43 and 44.

The first and second image data selective output sections 43 and 44 select the respective image data received from the memory section 32 according to a procedure (to be later explained), and then output the respective selected image data to first and second exposure energy control sections 35 and 36 respectively. The first and second exposure energy control sections 35 and 36 control respective exposure energies (emission time and emission power) of first and second semiconductor lasers 21 and 22 within first and second exposure sections 33 and 34 (to be explained later).

The first exposure section 33 including the first semiconductor laser 21 and the second exposure section 34 including the second semiconductor laser 22, act to irradiate laser beams on a photoconductor drum 1 to form an electrostatic latent image on the drum under conditions controlled by the first and second exposure energy control sections 35 and 36. Further, a clock generating section 40 generates a video clock as a reference of output of the image data to the first and second semiconductor lasers 21 and 22.

Explanation will now be made as to the structure of the first image data selective output section 43 with reference to FIG. 2. In this connection, the second image data selective output section 44 also has the same structure as the first image data selective output section 43. In FIG. 2, the first image data selective output section 43 incorporates a 2-input, 8-bit data selector 46, an 8-bit, parallel-to-serial converter 42 and a 2-input data selector 47.

Figure 3A:
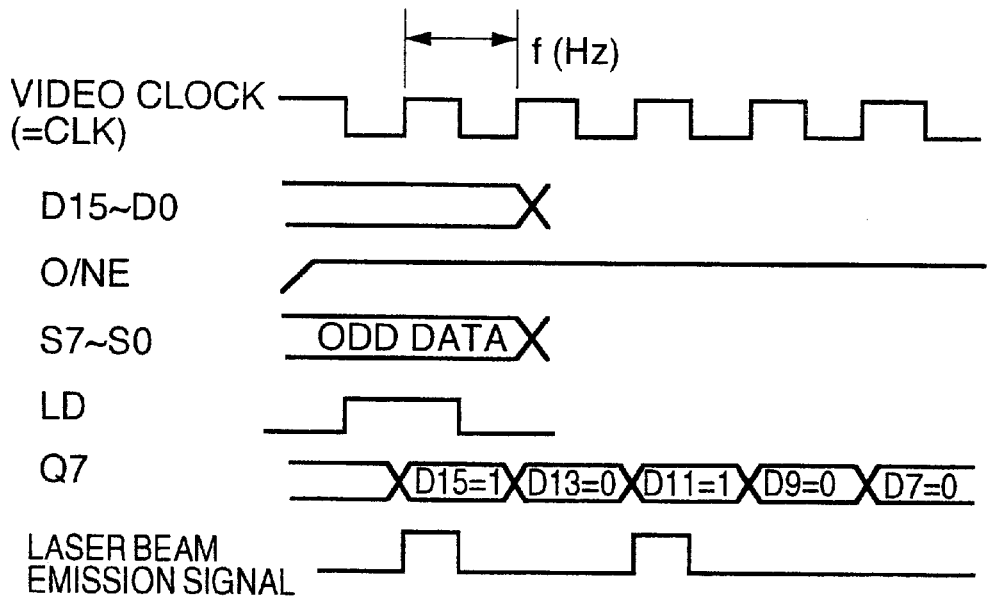
FIGS. 3A and 3B are timing charts for explaining the operation of the first image data selective output section of the image generating apparatus in accordance with the first embodiment of the present invention.
Figure 3B:
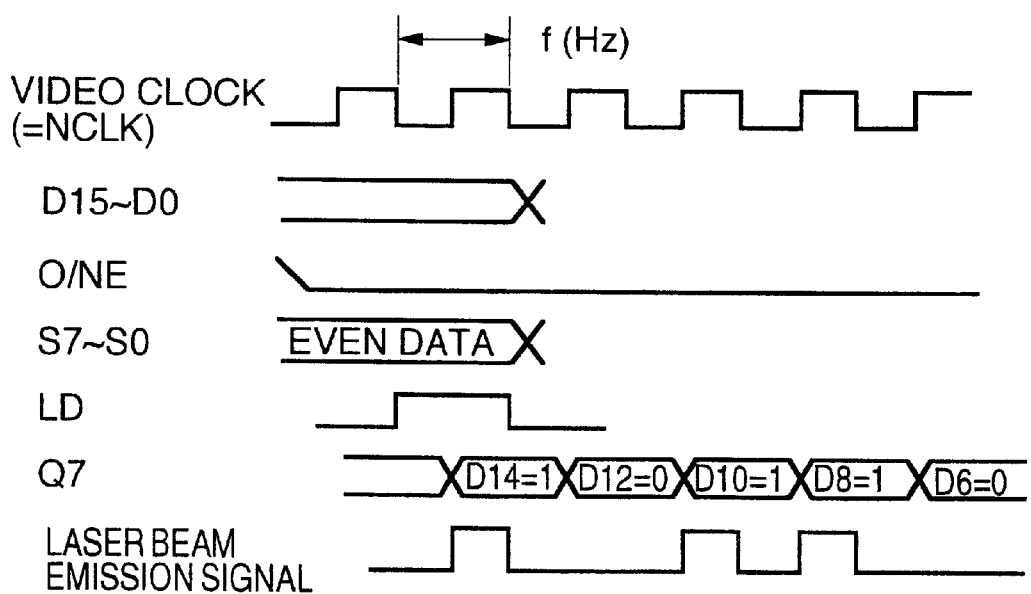

Explanation will next be made as to the operation of the first image data selective output section 43. FIGS. 3A and 3B are timing charts for explaining the operation of the first image data selective output section 43 in the image generating apparatus in accordance with the first embodiment of the present invention. Explanation will be made in the following in connection with an example of pixel formation having a main scan resolution of 1200 dpi and a sub-scan resolution of 600 dpi. In FIG. 2, the output control section 39 outputs a predetermined address to a DRAM 41 to input image data D15 to D0 corresponding to the address to the 2-input, 8-bit data selector 46. The data selector 46 selects the image data on the basis of a select signal (which will be referred to as signal O/NE, hereinafter) received from the output control section 39. That is, as shown in FIG. 3A, when the signal O/NE is at its high (H) level, the 8-bit data selector 46 selects data D15, D13, D11, D9, . . . D1, i.e., odd-numbered data or image data ODD from the image data D15 to D0. The image data S7 to S0 selected by the data selector 46 are applied to the 8-bit, parallel-to-serial converter 42 and latched therein by a latch signal (which will be referred to as the signal LD, hereinafter) received from the output control section 39. At the same time, the image data S7 to S0 are sequentially output as serial image data in synchronism with a video clock signal CLK from a serial output terminal Q7 of the 8-bit, parallel-to-serial converter 42. In this connection, the video clock signal CLX refers to one of the signals CLK generated by the clock generating section 40 and having the same frequency f(Hz) as with the main scan resolution of 600 dpi and of a signal NCLK corresponding to a inversion of the signal CLK, selected by the 2-input data selector 47.

Further, the serial image data and video clock signal issued from the 8-bit, parallel-to-serial converter 42 are applied to a 2-input AND gate 48. As shown in FIG. 3A, only when the image data is 1 (=H level) or only in the case of the presence of the image data, the 2-input AND gate 48 outputs an H-level signal as a laser beam emission signal to the first exposure energy control section 35. In this way, the second raster scan line of the image data ODD is sequentially output from the first image data selective output section 43 as the laser beam emission signal.

When the signal O/NE is at its low (L) level as shown in FIG. 3B, the second image data selective output section 44 selects D14, D12, D10, D8, . . . D0, i.e., even-numbered data or image data EVEN from the image data D15 to D0, and then applies it to the 2-input, 8-bit data selector. The selected image data S7 to S0 are also applied to the 8-bit, parallel-to-serial converter 42 and latched by the signal LD received from the output control section 39. At the same time, in synchronism with the inverted video clock signal NCLK corresponding to an inversion of the video clock signal applied to the first image data selective output section 43, serial image data are sequentially (starting with D14, D12, . . . ) output from the serial output terminal Q7 of the 8-bit parallel-to-serial converter 42. In this way, the first raster scan line of the image data EVEN is sent from the second image data selective output section 44 to the second exposure energy control section 36 as a laser beam emission signal.

The laser beam emission signal of the second raster scan line of the image data ODD issued from the first image data selective output section 43 as well as the laser beam emission signal of the first raster scan line of the image data EVEN issued from the second image data selective output section 44 simultaneously with it, are set by the first and second exposure energy control sections 35 and 36 at a predetermined exposure energy respectively, applied to the first semiconductor laser 21 of the first exposure section 33 and to the second semiconductor laser 22 of the second exposure section 34, optically modulated thereby, and then recorded on the photoconductor drum 1 as an electrostatic latent image corresponding to 2 raster scan lines through one scanning operation.

The operation will next be moved to the second scanning operation. In this case, the photoconductor drum 1 is rotating at a rotational speed (i.e., Vp/2 (mm/sec.)) corresponding to half of that of the prior art image generating apparatus. For this reason, through the second main scanning operation, the first exposure section 33 scans the second raster scan line. And the second exposure section 34 scans the third raster scan line.

Figure 4:
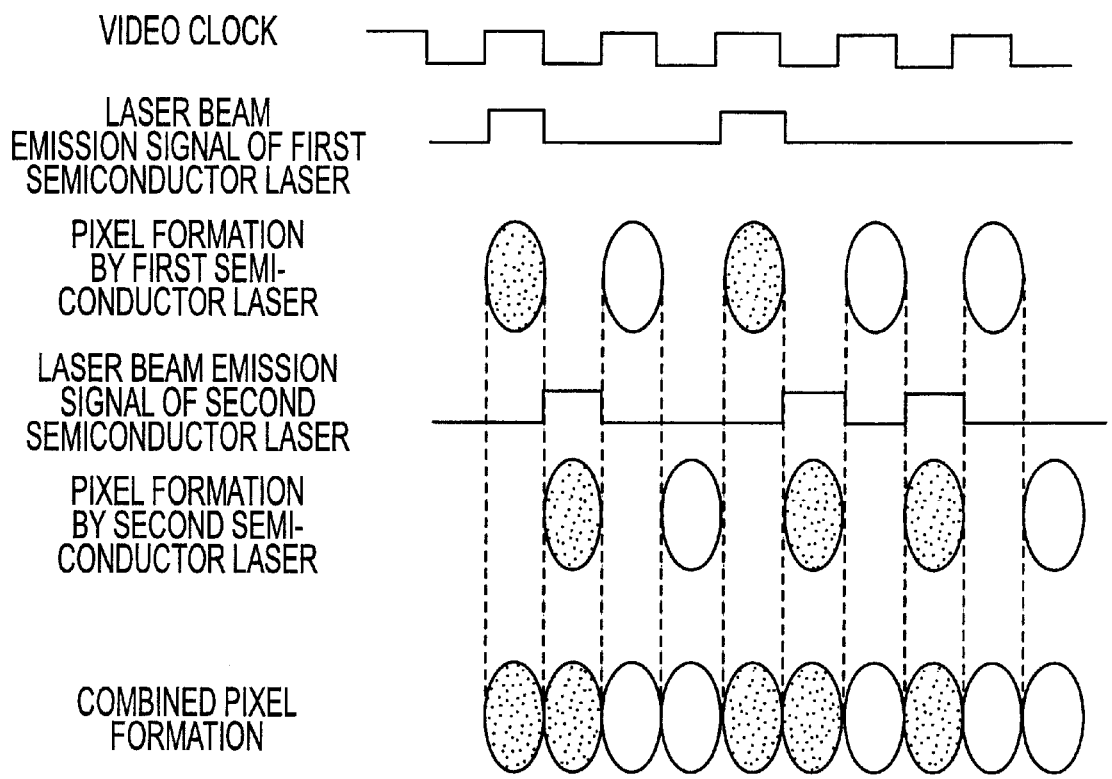
FIG. 4 shows a relationship between laser beam emission signals and formed pixels in the image generating apparatus of the first embodiment of the present invention.
Figure 16:
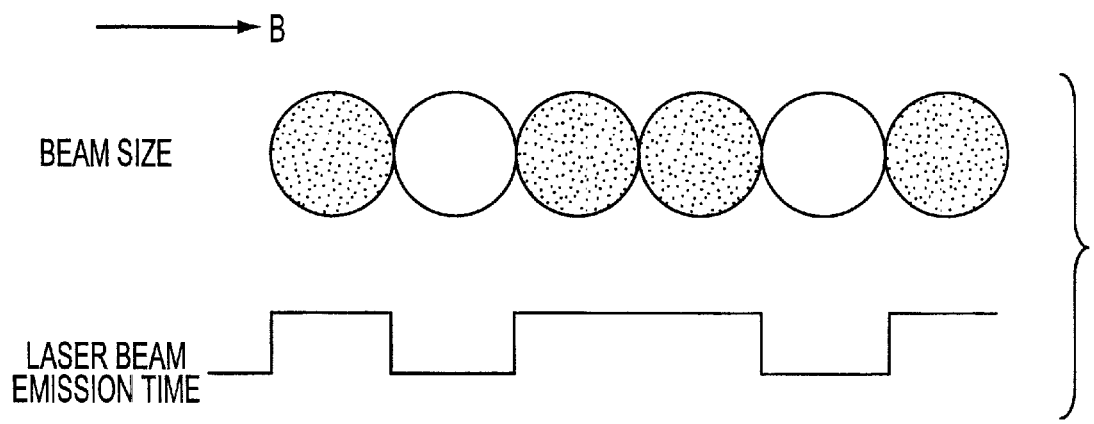
FIG. 16 shows a relationship between pixel formation and laser beam emission time in the prior art image generating apparatus.
Figure 17:
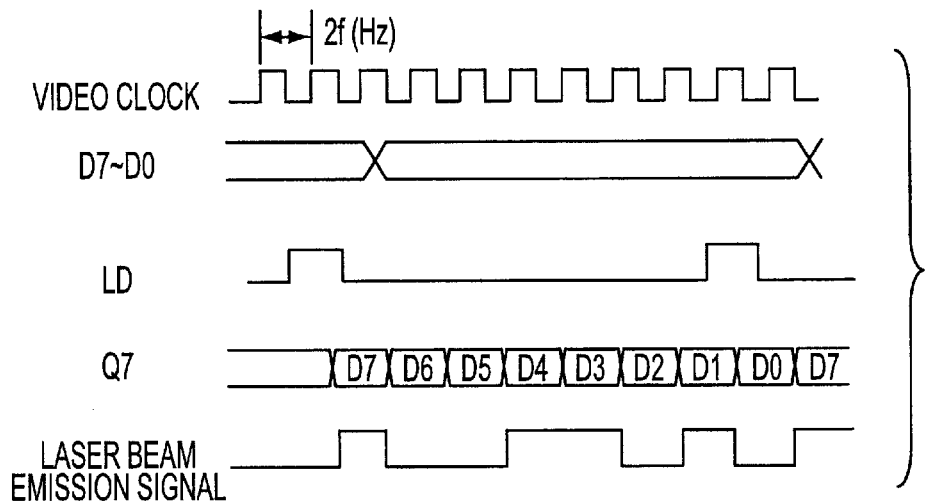
FIG. 17 is a timing chart for explaining the operation of the first image data selective output means when the prior art image generating apparatus is operated in a high-density record mode.
Figure 18:
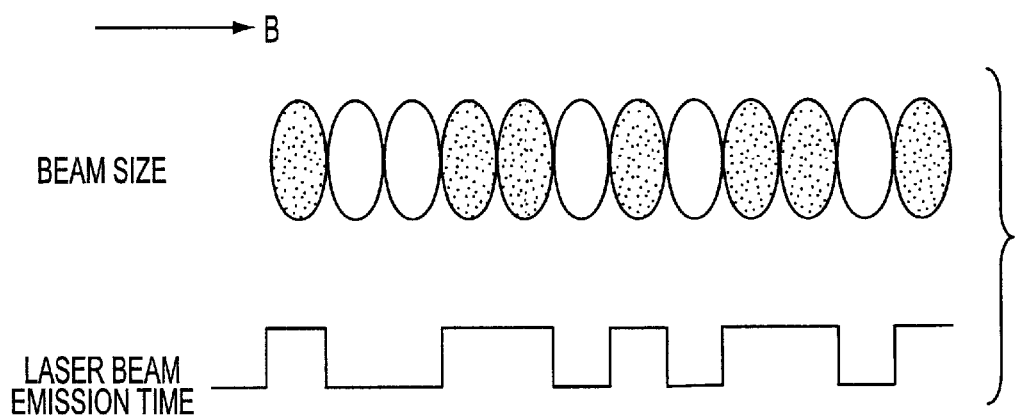
FIG. 18 shows a relationship between a laser beam emission signal and formed pixels when the prior art image generating apparatus is operated with a high resolution.

Shown in FIG. 4 is a relationship between the laser beam emission signals and formed pixels in the image generating apparatus in accordance with the first embodiment of the present invention. As shown in FIG. 4, the laser beams of the first and second semiconductor lasers 21 and 22 are modulated and reduced in their diameters in a main scanning direction shown by an arrow B. For this reason, the number of pixels in the main scanning direction B is increased to twice (1200 dpi) the pixel number in the prior art of FIG. 16. On one raster scan line, odd-numbered pixels are formed by the first semiconductor laser 21 and even-numbered pixels are formed by the second semiconductor laser 22. And one raster line of pixel formation is carried out through 2 scanning operations of the 2 semiconductor lasers.

Figure 5A:
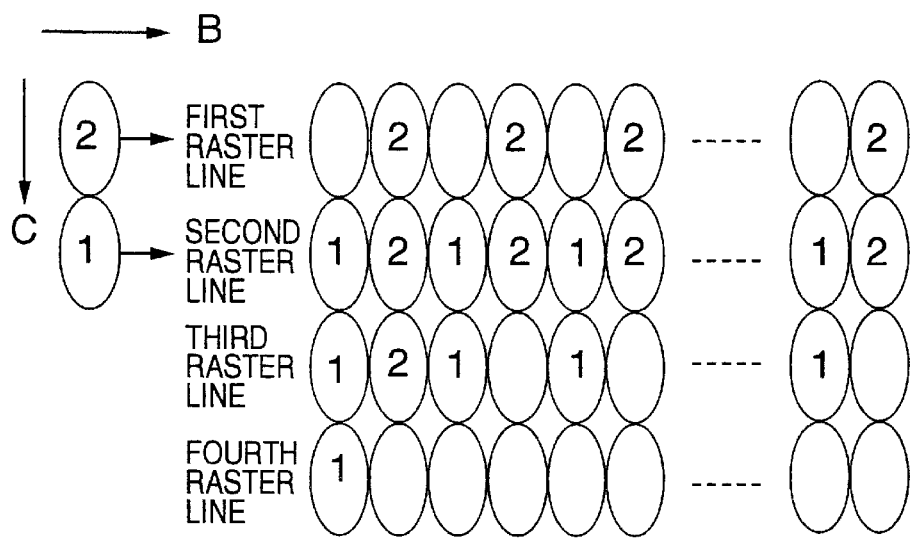

FIG. 5 shows, in model form, pixel formation conditions. More specifically, in FIG. 5A, through the first main scanning operation, the image data EVEN formed by the second semiconductor laser 22 are denoted by "2", whereas the image data ODD formed by the first semiconductor laser 21 are denoted by "1". Accordingly, through the first main scanning operation, the EVEN pixels of the first raster scan line are recorded by the second semiconductor laser 22, and at the same time, the ODD pixels of the second raster scan line are recorded by the first semiconductor laser 21.

Figure 11:
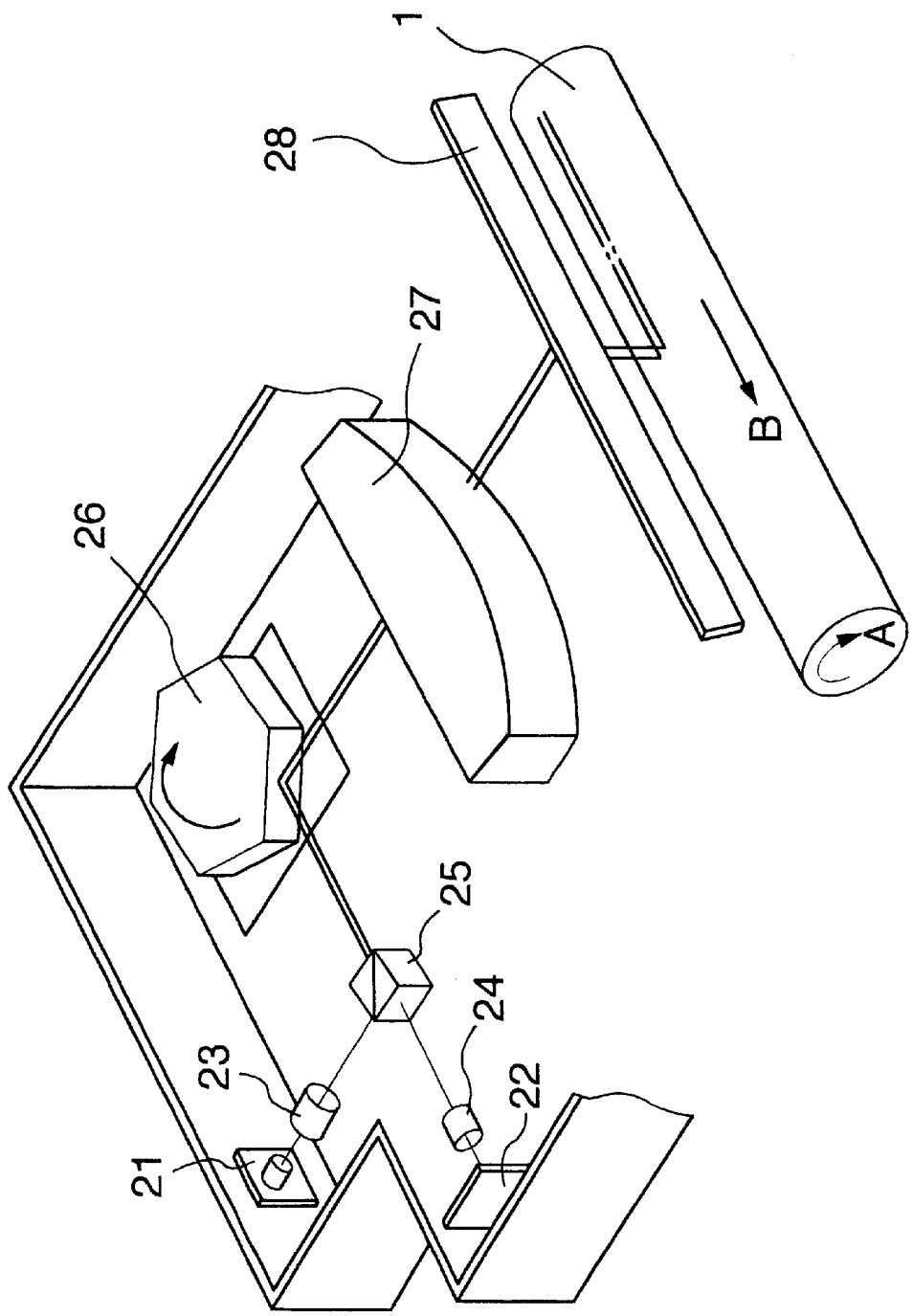
FIG. 11 is an arrangement of a prior art exposure optical system having a plurality of semiconductor lasers.

Further, the second main scanning operation causes the photoconductor drum 1 to rotate by an amount corresponding to one raster line in a direction shown by an arrow A (refer to FIG. 11). For this reason, the EVEN pixels of the second raster scan line are recorded by the second semiconductor laser 22 while the ODD pixels of the third raster scan line are recorded by the first semiconductor laser 21. As a result, on the second raster scan line, all the EVEN and ODD pixels are recorded and the recording operation is completed.

The reason why the raster scan lines and semiconductor lasers are reversely numbered is that, as shown in FIG. 5A, pixels are recorded on the first raster scan line only on every other pixel basis, so that the pixels recorded by the second semiconductor laser 22 are denoted by "2" herein for the sake of the convenience of explanation.

In this way, when such an operation as mentioned above is repeated toward a sub-scanning direction shown by an arrow C, high-density image formation in the main scanning direction can be realized with the frequency of the video clock set to be similar to the prior art image generating apparatus.

Figure 5B:
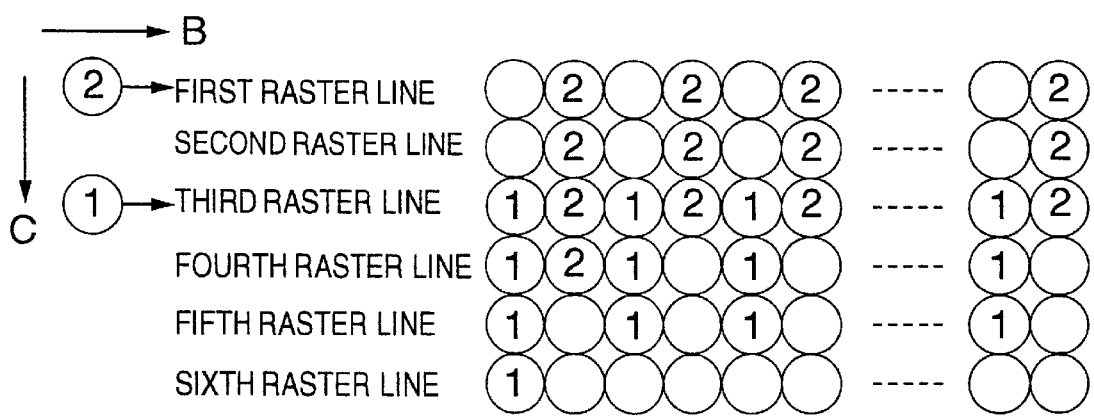

Further, the image generating apparatus of the present embodiment can increase the recording density not only in the main scanning direction but also in the sub-scanning direction. In this case, as shown in FIG. 5B, the exposure energy is reduced by the first and second exposure energy control sections 35 and 36, so that an exposure area of the first and second semiconductor lasers 21 and 22 becomes small and a gap takes place in the sub-scanning direction (in the arrow C direction). In addition, the rotational speed of the photoconductor drum 1 is set at half of that of the above case, i.e., Vp/4 (mm/sec.).

Thus, recording by the first semiconductor laser 21 can be carried out starting from the third raster scan line, while recording by the second semiconductor laser 22 can be carried out starting from the first raster scan line. Further, with respect to the sub-scanning direction C, the number of raster scan lines is doubly increased compared with that of the case of FIG. 5A. And the third main scanning operation causes the second semiconductor laser 22 to record pixels on the third raster scan line, thus completing the recording operation of the ODD and EVEN pixels.

In this way, the pixel formation can be decreased by reducing the exposure energies of the first and second exposure energy control sections 35 and 36, and the pixel formation having a main scan resolution of 1200 dpi and a sub-scan resolution of 1200 dpi can be carried out by decreasing the rotational speed of the photoconductor drum 1 without any need for raising the frequency of the video clock.

(Embodiment 2)

Figure 6:
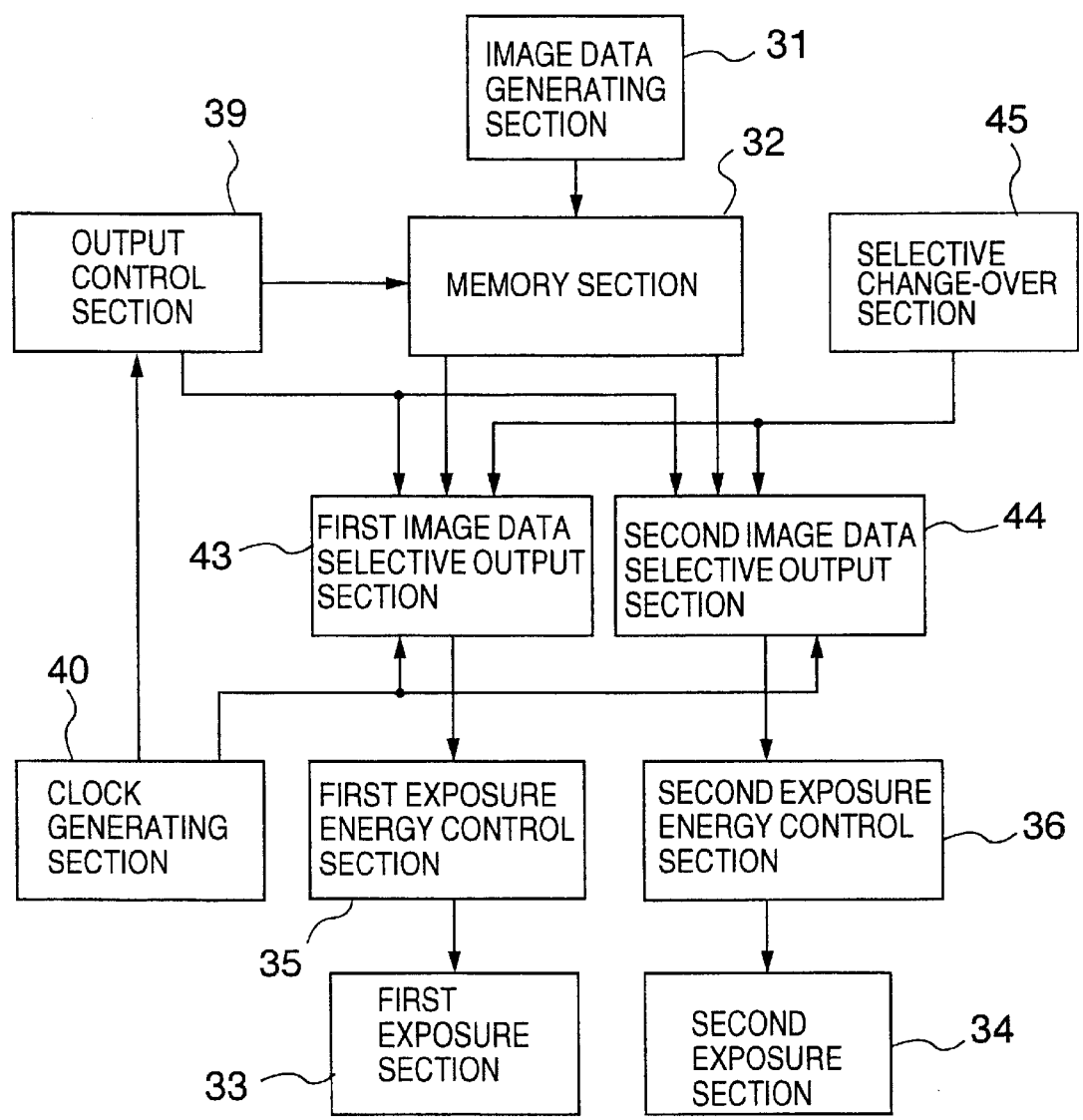
FIG. 6 is a control block diagram of an image generating apparatus in accordance with a second embodiment of the present invention.

FIG. 6 is a control block diagram of an image generating apparatus in accordance with a second embodiment of the present invention. The image generating apparatus shown in FIG. 6 is different from the image generating apparatus of the first embodiment in that a selective change-over section 45 is provided. The selective change-over section 45 has a function of turning ON or OFF an image data selection function for high-density recording based on the first and second image data selective output sections 43 and 44.

When the selective change-over section 45 places the image selection functions of the first and second image data selective output sections 43 and 44 in their ON state, the recording density in the main scanning or sub-scanning direction is improved without the need for raising the frequency of the video clock signal, as already explained in the above first embodiment.

Figure 12:
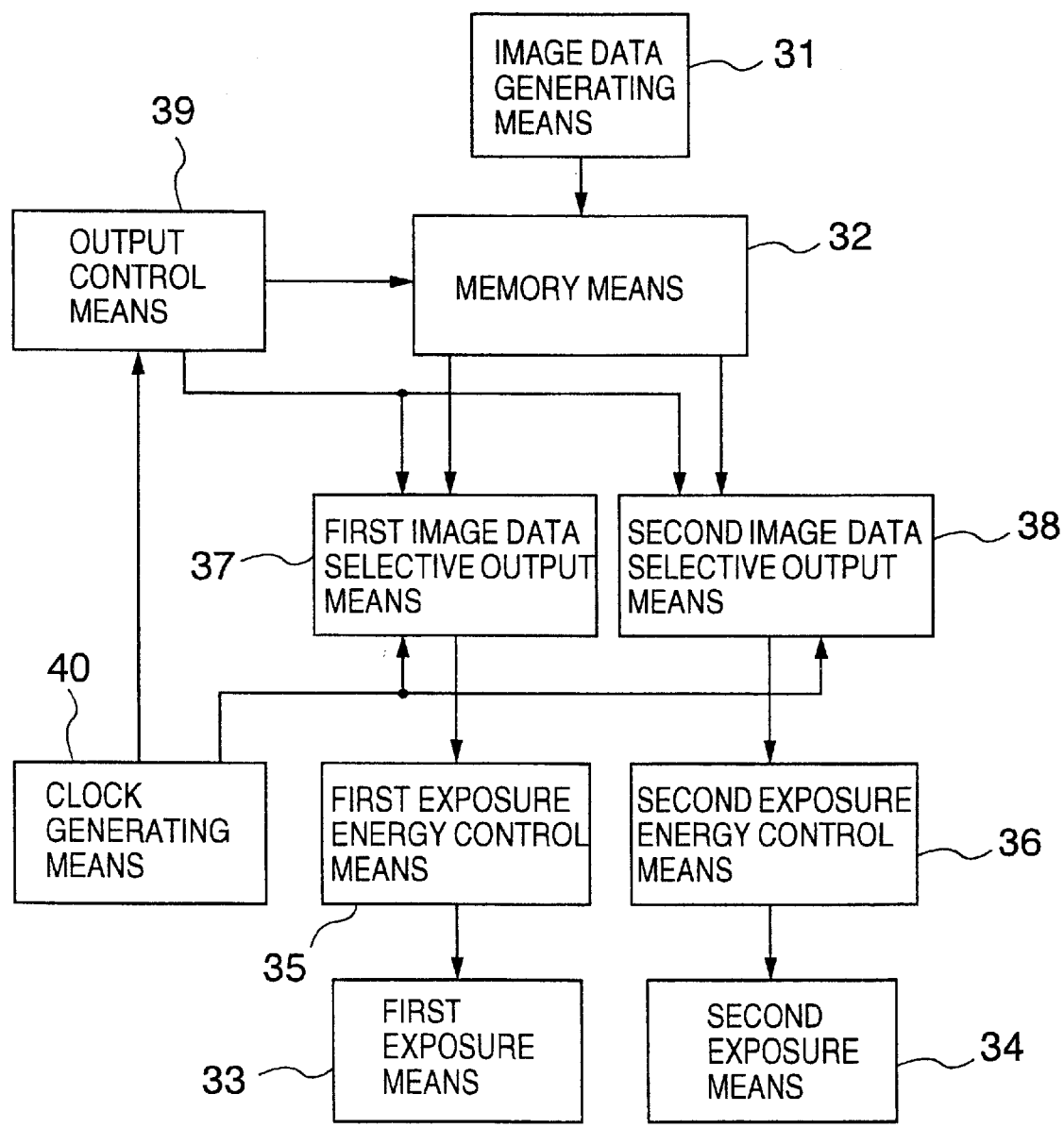
FIG. 12 is a control block diagram of the prior art image generating apparatus.
Figure 13:
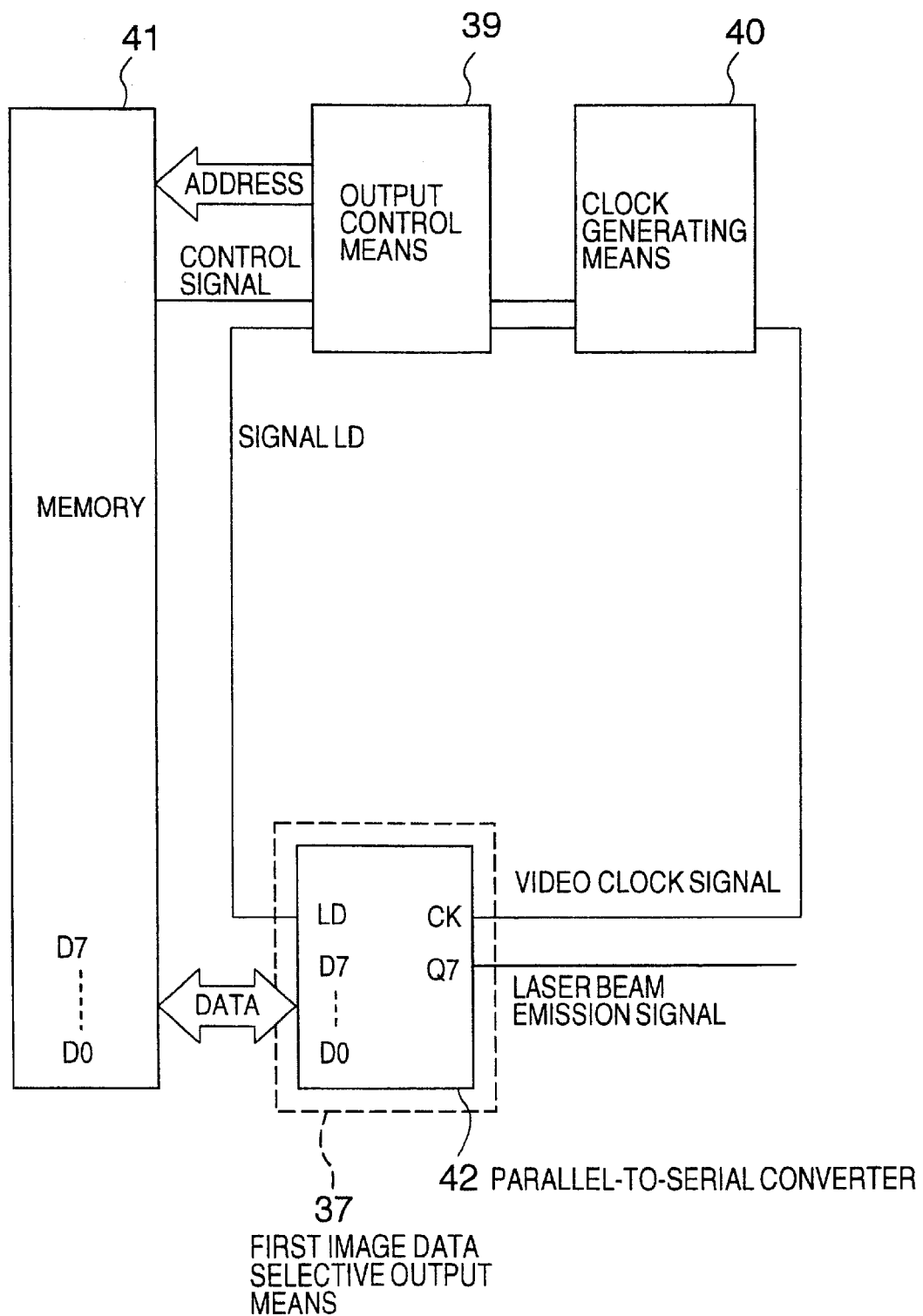
FIG. 13 is a detailed circuit diagram of a first image data selective output means in the prior art image generating apparatus.
Figure 14:
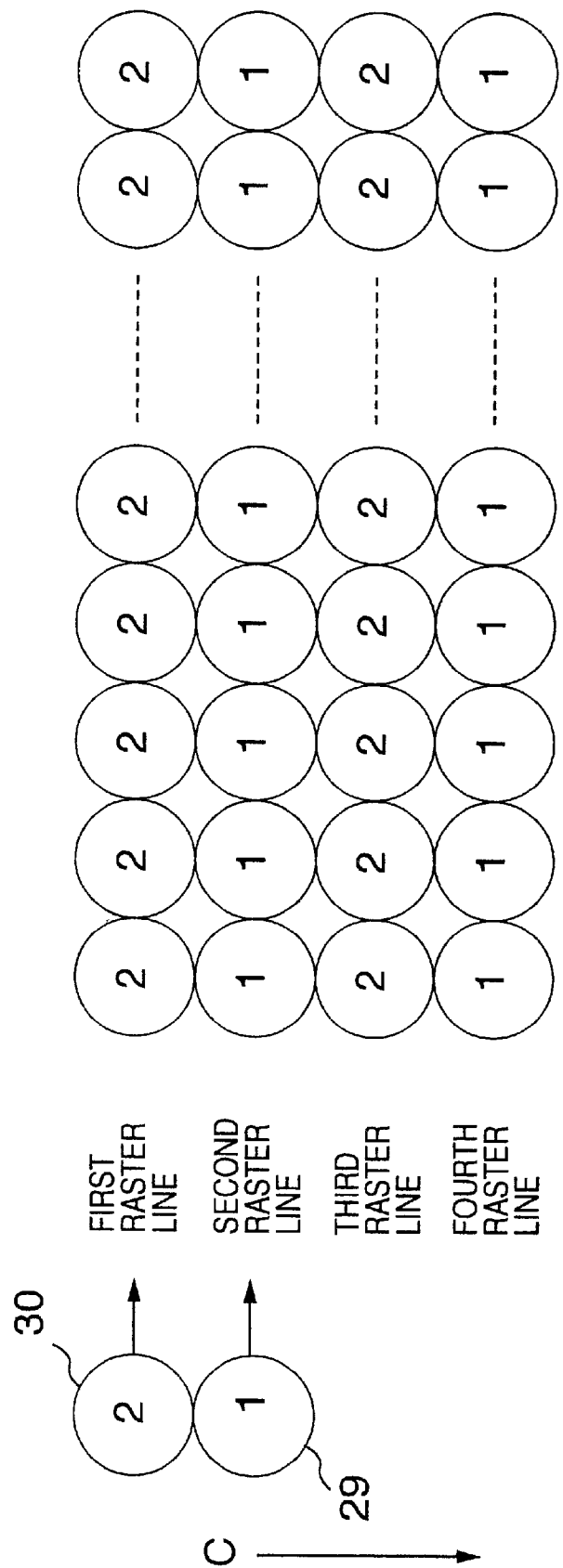
FIG. 14 shows a pixel data formation in the prior art image generating apparatus.
Figure 15:
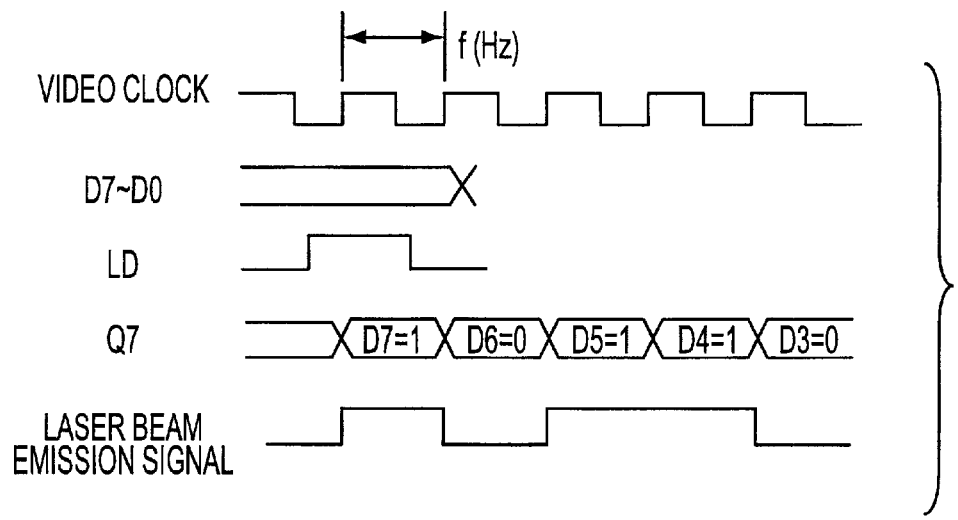
FIG. 15 is a timing chart for explaining the operation of the first image data selective output means in the prior art image generating apparatus.

When the selective change-over section 45 places the image selection functions of the first and second image data selective output sections 43 and 44 in their OFF state, as in the prior art image generating apparatus of FIG. 12, the image data corresponding to 2 raster scan lines are output simultaneously from the first and second image data selective output sections 43 and 44, so that the first exposure section 33 (first semiconductor laser 21) and the second exposure section 34 (second semiconductor laser 22) perform each main scanning operation corresponding to one raster scan line, whereby the image formation of the 2 lines is realized through one main scanning operation.

More in detail, with use of the selective change-over section 45, it is possible to perform the change-over in the pixel formation, e.g., between a normal mode having a main scan resolution of 600 dpi and a sub-scan resolution of 600 dpi and a high quality mode having a main scan resolution of 1200 dpi and a sub-scan resolution of 1200 dpi.

(Embodiment 3)

Figure 7:
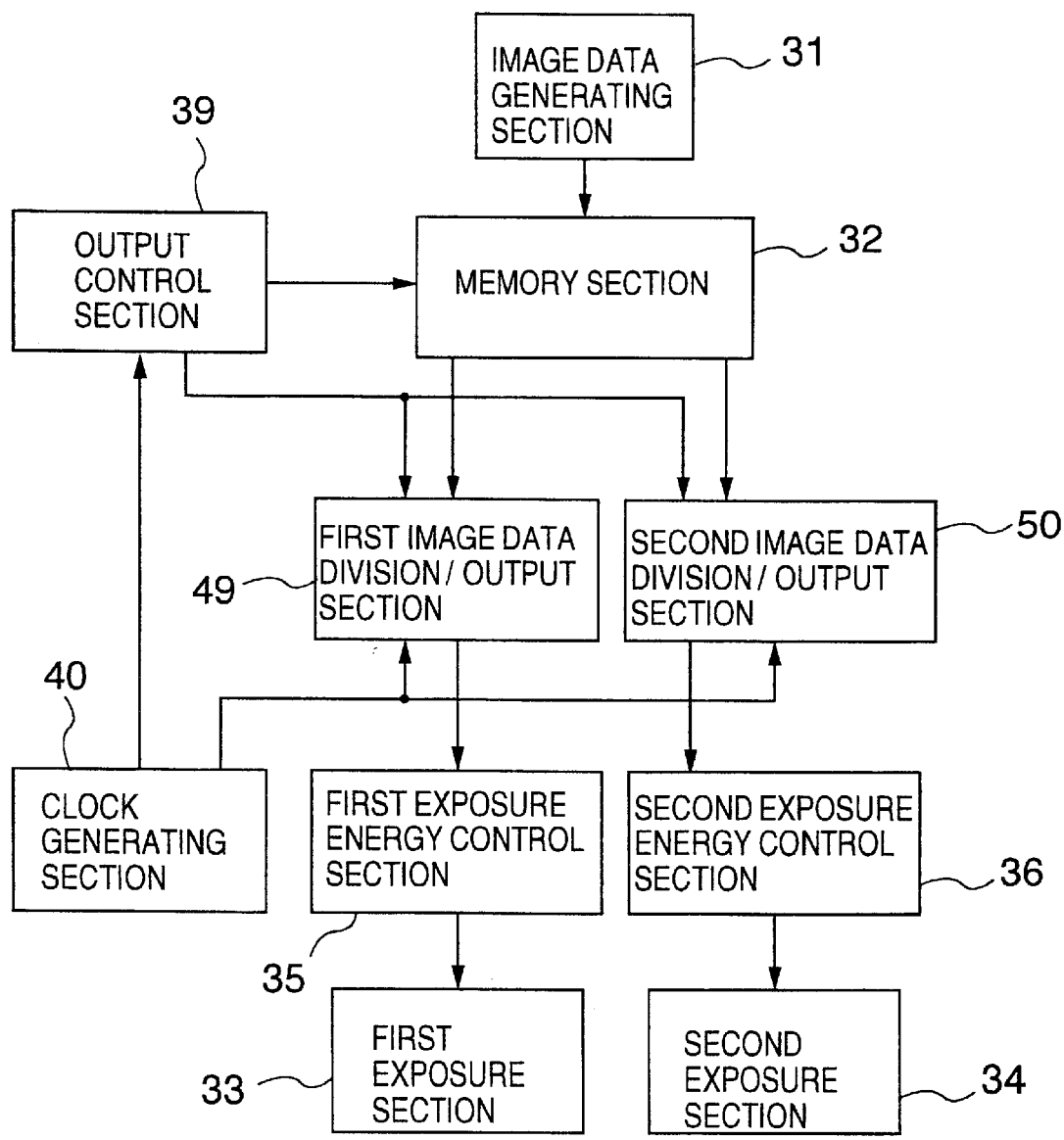
FIG. 7 is a control block diagram of an image generating apparatus in accordance with a third embodiment of the present invention.
Figure 8A:
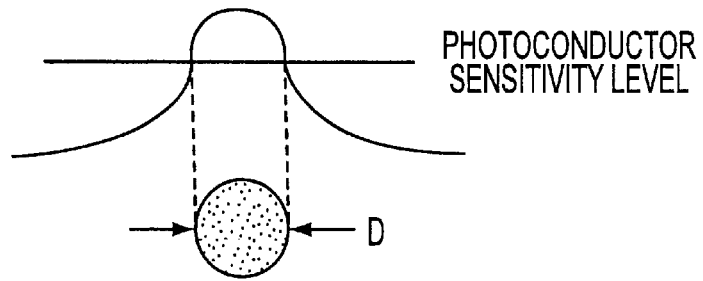
FIGS. 8A to 8C show relationships between a pixel distribution and pixel diameter of a semiconductor laser in the image generating apparatus of the third embodiment.
Figure 8B:
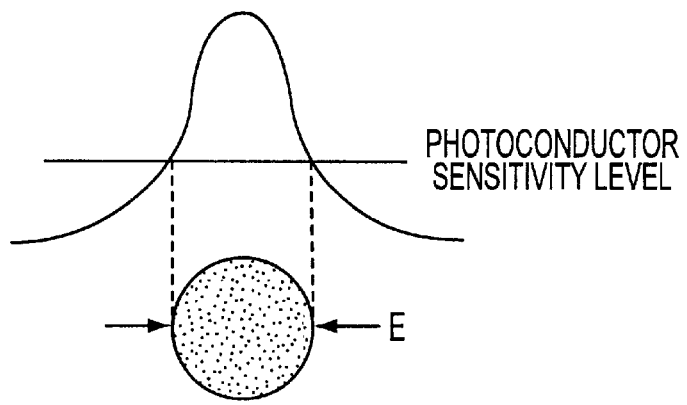
Figure 8C:
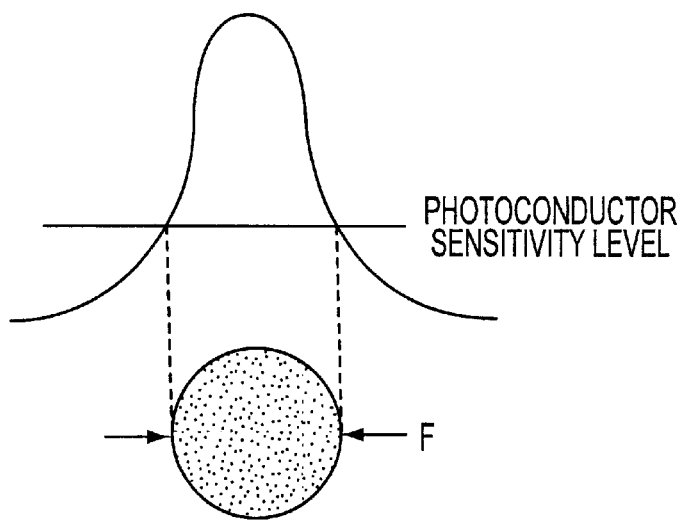
Figure 9:
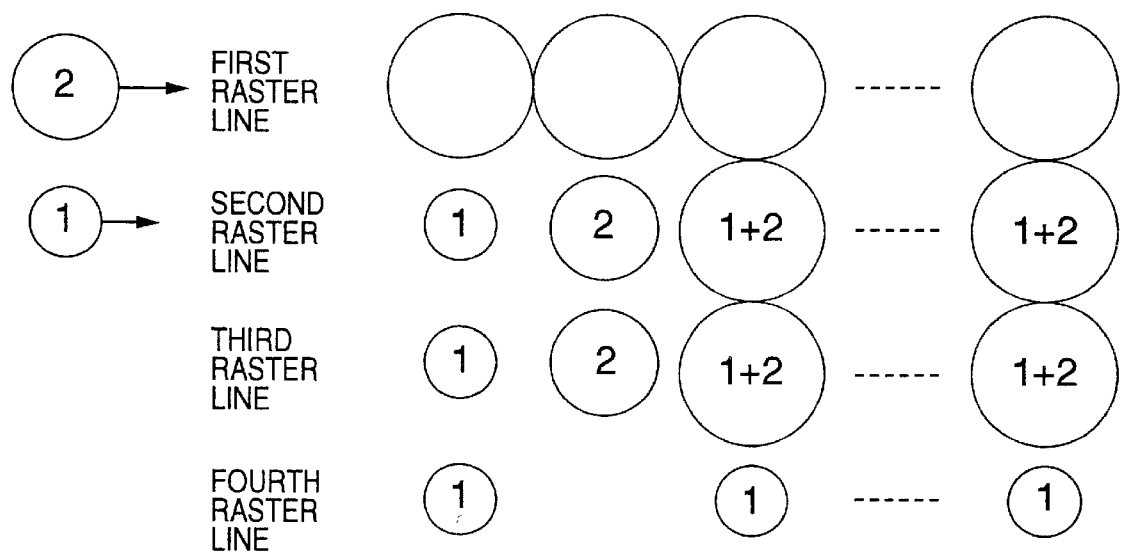
FIG. 9 shows pixel formation in the image generating apparatus of the third embodiment.

FIG. 7 is a control block diagram of an image generating apparatus in accordance with a third embodiment of the present invention. FIGS. 8A to 8C show relationships between pixel distributions and pixel diameters of semiconductor lasers in the image generating apparatus of the third embodiment. Further, FIG. 9 is a diagram for explaining the pixel formation of the image generating apparatus of the third embodiment.

The image generating apparatus of the present embodiment enables gray shade display without the need for raising the frequency of the video clock signal. And for the purpose of realizing the gray shade display, a first image data division/output section 49 and a second image data division/output section 50 are provided in FIG. 7. In FIG. 7, parts having the same structures as those of the first embodiment in FIG. 1 are denoted by the same reference numerals and explanation thereof is omitted.

In order to obtain a high quality of image such as photograph or the like, it is necessary to increase its pixel density or gray shade property. Explanation will be made in the following as to how to form image data based on 4-level gray shade display with a main scan resolution of 600 dpi and a sub-scan resolution of 600 dpi.

Prior to the explanation of the operation, the principle of the 4-level gray shade display will be explained with reference to FIGS. 8A to 8C. As shown in FIGS. 8A to 8C, the energy of the laser beams issued from the first and second semiconductor lasers 21 and 22 takes a Gaussian distribution. And in the Gaussian distribution, an area in which the energy of the laser beams irradiated on the photoconductive body (photoconductor drum 1) exceeds a predetermined photoconductor sensitivity level corresponds to a pixel zone. In FIG. 8A, for example, a black circle area having a diameter D becomes a pixel. The image generating apparatus of the present embodiment has the 2 semiconductor lasers 21 and 22. Accordingly, when the output energies of the 2 semiconductor lasers are made different from each other, the pixel (shown in FIG. 8A) having a diameter of D and a pixel (shown in FIG. 8B) having a diameter of E larger than the diameter D can be formed.

As shown in FIG. 8C, when the laser beams of the first and second semiconductor lasers 21 and 22 are superimposed or combined each other into a single beam, a pixel having the largest diameter of F can be formed. In this way, the gray shade display can be realized with the pixel formation of 4 levels, that is, the pixel by the first semiconductor laser 21, the pixel by the second semiconductor laser 22, the pixel based on the combination of the laser beams of the first and second semiconductor lasers 21 and 22, and the pixel based on no laser beam. In this connection, the emission energy of the laser beam of the first semiconductor laser 21 is controlled by the first exposure energy control section 35, while the emission energy of the laser beam of the second semiconductor laser 22 is controlled by the second exposure energy control section 36.

In FIG. 7, an image data generating section 31, on the basis of image information received from a host computer (not shown), generates 4-level image data (bit map data) and stores it in a memory section 32. An output control section 39, on the basis of a printing operation reference signal, controls the memory section 32 to output the first raster scan line of image data to a second image data division/output section 50 and to output the second raster scan line of image data to a first image data division/output section 49.

The first image data division/output section 49 divides the received 4-level image data of the second raster scan line into two levels of data of "1" (H level) which outputs only pixels having sizes (diameters) of D and F and of "0" (L level) which outputs the other pixels, and applies the image data to the 8-bit parallel-to-serial converter (not shown) within the first image data division/output section 49 to be latched by the signal LD received from the output control section 39. At the same time, in synchronism with the video clock signal received from the clock generating section 40, the latched image data are sequentially output as a laser beam emission signal to the first exposure energy control section 35 from the serial output terminal Q7 of the 8-bit parallel-to-serial converter (not shown).

Similarly, the second image data division/output section 50 divides the received 4-level image data of the first raster scan line into two levels of the image data of "1" (H level) which outputs only pixels having sizes (diameters) of E and F and of "0" (L level) which outputs the other pixels, and applies the image data to the 8-bit parallel-to-serial converter (not shown) within the second image data division/output section 50 to be latched by the signal LD received from the output control section 39. At the same time, in synchronism with the video clock signal received from the clock generating section 40, the latched image data are sequentially output as a laser beam emission signal to the second exposure energy control section 36 from the serial output terminal Q7 of the 8-bit parallel-to-serial converter (not shown).

The laser beam emission signal of the second raster scan line of the pixel size of D or F issued from the first image data division/output section 49 and the laser beam emission signal of the first raster scan line of the pixel size of E or F issued from the second image data division/output section 50 simultaneously therewith, are applied to the first semiconductor laser 21 of the first exposure section 33 and to the second semiconductor laser 22 of the second exposure section 34 through the first and second exposure energy control sections 35 and 36 respectively, and then optically modulated therein so that the 2 raster scan lines (first and second raster scan lines) are recorded as an electrostatic latent image on the photoconductor drum 1 through one main scanning operation.

Next, the operation is shifted to the second main scanning operation. The photoconductor drum 1 is rotating at a rotational speed corresponding to half of the speed of the prior art, i.e., Vp/2 (mm/sec.) Accordingly, the next main scanning operation causes the scanning positions of the first and second semiconductor lasers 21 and 22 to be moved by an amount of one raster line along the sub-scanning direction C.

In FIG. 9, during the second main scanning operation, a laser beam emission signal of the third raster scan line of the pixel size of D or F issued from the first image data division/output section 49 as well as a laser beam emission signal of the second raster scan line of the pixel size of E or F issued from the second image data division/output section 50 are used so that the second and third raster scan lines are simultaneously recorded on the photoconductor drum 1 as an electrostatic latent image. As a result, on the second raster scan line, with respect to the pixels having the size of F, the pixels of the first main scanning operation of the first semiconductor laser 21 are overlapped with the pixels of the second main scanning operation of the second semiconductor laser 22, whose overlapped pixels are denoted by "1+2" in FIG. 9.

Through the above repetitive operations, as shown in FIG. 9, there can be obtained 4 levels of pixels, that is, no pixel, pixels "1" having the size of D based on the first semiconductor laser 21, pixels "2" having the size of E based on the second semiconductor laser 22, and pixels "1+2" having the size of F based on the combination of the first and second semiconductor lasers 21 and 22. As a result, with use of the video clock signal similar to that of the prior art, 4-level gray shade display can be implemented.

In the present invention, further, there can be realized not only the above 4-level gray shade display but also multiple-level gray shade display by using an increased number of semiconductor lasers to perform pixel formation based on proper overlapping.

(Embodiment 4)

Figure 10:
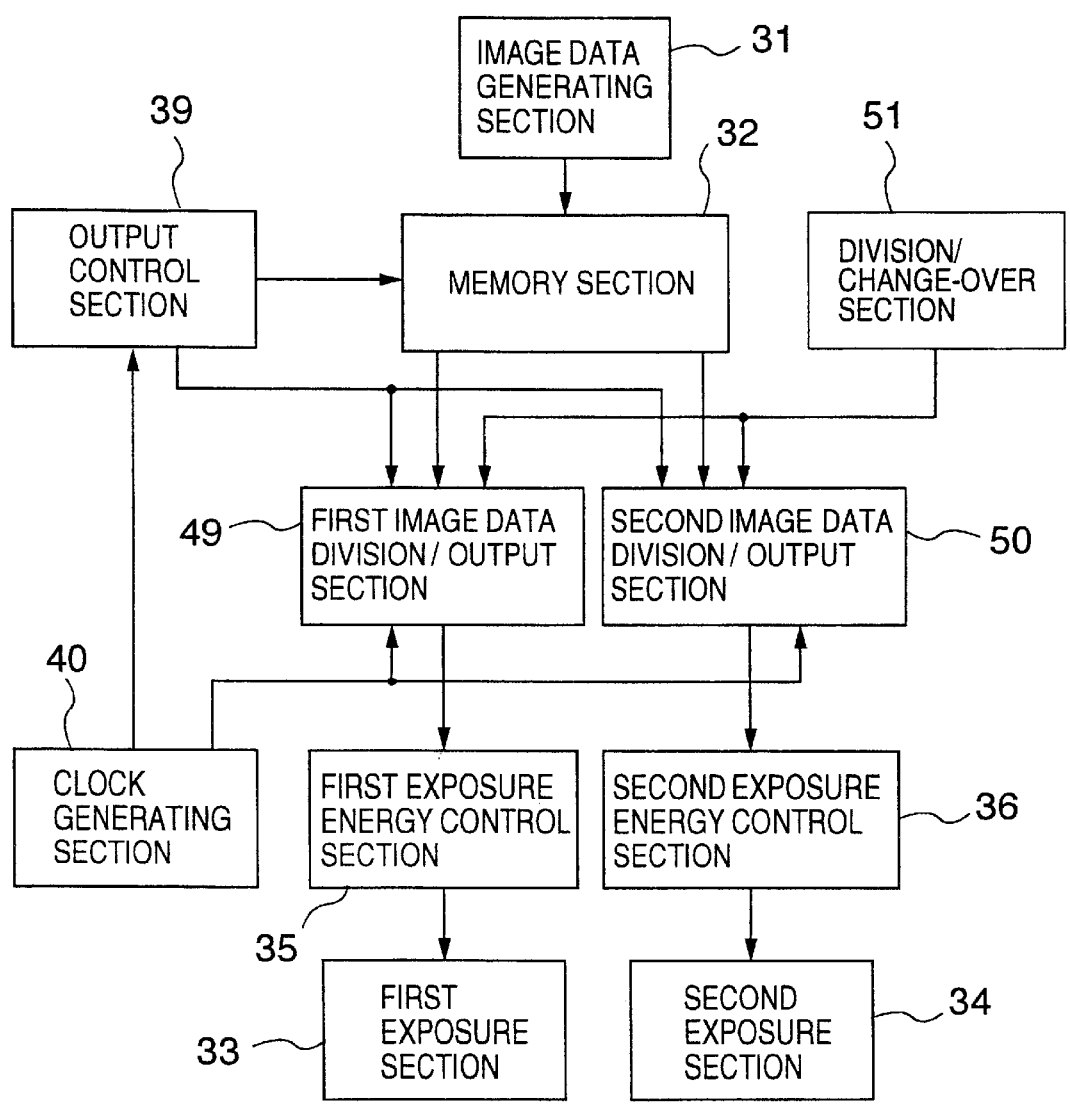
FIG. 10 is a control block diagram of an image generating apparatus in accordance with a fourth embodiment of the present invention.

FIG. 10 is a control block diagram of an image generating apparatus in accordance with a fourth embodiment of the present invention. The image generating apparatus of the fourth embodiment is different from the image generating apparatus of the third embodiment in that a division/change-over section 51 is provided.

The division/change-over section 51 has a function of turning ON or OFF a division function of gray shade levels based on the first and second image data division/output sections 49 and 50.

When the division function of the image data is turned ON, as already mentioned in connection with the third embodiment, image data of pixels of the size of D or F divided by the first image data division/output section 49 are recorded on the photoconductor drum 1 in the form of a predetermined raster scan line through the first scanning operation of the first exposure section 33, and image data of pixels of the size of E or F divided by the second image data division/output section 50 are recorded as overlapped therewith on the photodonductor drum 1 on a predetermined raster scan line through the second scanning operation of the second exposure section 34. As a result, 4-level gray shade display can be realized.

When the division/change-over section 51 is set in its OFF state, the first semiconductor laser 21 of the first exposure section 33 has the same set conditions as the second semiconductor laser 22 of the second exposure section 34, whereby one main scanning operation enables recording of 2 raster scan lines. More specifically, with use of the division/change-over section 51, there can be facilitated, for example, change-over between a normal mode having a main scan resolution of 600 dpi and a sub-scan resolution of 600 dpi and a high quality mode having a main scan resolution of 600 dpi and a sub-scan resolution of 600 dpi based on the 4-level gray shade display.

As has been explained in the foregoing, since the image generating apparatus of the present invention is arranged so that a single main scanning line of image data is recorded through a plurality of scanning operations with use of a plurality of exposure sections, its resolution can be improved without the need for increasing the frequency of the video clock for definition of timing of image formation, whereby a high quality of text image such as, in particular, character, line or the like can be realized.

Further, since the image generating apparatus of the present invention is arranged to perform change-over operation between the aforementioned high-resolution image formation mode and the conventional normal mode allowing simultaneous recording of a plurality of lines of image data through one scanning operation, the recording mode can be easily selected according to the applications, thus remarkably improving its operability.

Further, since the image generating apparatus of the present invention is arranged so that a plurality of scanning operations are carried out by a plurality of exposure sections for a single main scanning line and image data of the gray shade display based on different exposure energies are recorded; a plurality of levels of gray shade display can be realized without the need for raising the frequency of the video clock for defining the timing of the image formation, whereby a high quality of image such as, in particular, photograph can be realized.

Furthermore, since the image generating apparatus of the invention is arranged to perform change-over operation between the aforementioned gray shade display mode and the conventional normal mode allowing simultaneous recording of a plurality of lines of image data through one scanning operation; the recording mode can be readily selected according to the applications, thus remarkably enhancing its operability.

What is claimed is:

1. An image generating apparatus comprising:

exposure means for forming, in accordance with image data, pixels on an image carry body, said exposure means including a plurality of light emission means for emitting an optical beam;

pixel diameter adjustment means for adjusting a diameter of said pixels in a main-scan direction according to an exposure energy amount of an optical beam emitted by said exposure means; and drive velocity adjustment means for adjusting a drive velocity of said image carry body in order to adjust a resolution of said pixels in a sub-scan direction;

reference signal generation means for outputting a constant frequency reference signal for functioning as a reference for controlling image data output to said exposure means, wherein a frequency of said constant frequency reference signal is fixed independent of the resolution of said pixels; and control means for distributing said image data to said plurality of light emission means and for performing an image generation in which one of said plurality of light emission means forms pixels on said image carry body in a main scan direction and another of said plurality of light emission means forms a pixel in a gap of said pixels formed by said one of said plurality of light emission means in said main scan direction, said image data comprising an image sequence in said main scan direction.

2. An image generating apparatus as set forth in claim 1, further comprising switching means for switching a combination of exposure energy amounts of said plurality of light emission means and said drive velocity of said image carry body adjusted by said drive velocity adjustment means.

* * * * *